United States Patent
Walon

[15] 3,650,829
[45] Mar. 21, 1972

[54] METHOD OF PRODUCING GRANULAR DEXTROSE

[72] Inventor: Raoul Guillaume Philippe Walon, Brussells, Belgium

[73] Assignees: CPC International Inc.; Les Industries du Mais

[22] Filed: Aug. 6, 1969

[21] Appl. No.: 848,100

[52] U.S. Cl. .................................. 127/60, 99/90, 99/134 R, 127/30
[51] Int. Cl. ........................................ C13k 1/06, C13k 1/10
[58] Field of Search .............................................. 127/30, 60

[56] References Cited

UNITED STATES PATENTS 1,471,347  10/1923  Newkirk .................................. 127/30
1,521,829  6/1925   Newkirk .................................. 127/30

Primary Examiner—Morris O. Wolk
Assistant Examiner—Sidney Marantz
Attorney—Frank E. Robbins, Joseph Shekleton, Janet E. Price, Robert D. Weist, Martha A. Michaels and Dorothy R. Thumler

[57] ABSTRACT

A process for producing a granular dextrose product having a high content of beta dextrose by seeding a starch hydrolyzate solution containing at least about 90% by weight dry substance, and having a dextrose equivalent of at least 90, to obtain a crystallized mass, breaking the mass up into particles, and recovering a granular dextrose product. Also, the use of the product for lozenges and bakery products.

9 Claims, No Drawings

METHOD OF PRODUCING GRANULAR DEXTROSE

This invention relates to an improved method of producing granular dextrose whereby granular dextrose of desired particle size can be produced from a high dextrose equivalent starch hydrolyzate solution in a short period of time.

Present processes for the production of granular dextrose from starch hydrolyzate solutions comprise decolorizing the starch hydrolyzate solution with powdered carbon, granular carbon, or ion exchange resins to remove color, ash, and other minor impurities, evaporating the solution under vacuum to a solids content falling within the range from about 70% to about 78%, cooling the solution to about 46° C., and feeding the solution into large crystallizers in which about 20% to about 25% of a previous batch of dextrose crystals is retained to provide a seed bed. The resulting mass is then cooled to a temperature falling within the range from about 20° C. to about 30° C. over a period of time falling within the range from about 3 to about 5 days, after which time about 60% of the solids are crystallized as dextrose. The mother liquor is then separated from the solid dextrose crystals, and the crystals are washed with a spray of water. The resulting crystalline sugar, which contains about 14% moisture, is then dried in large rotary driers in a stream of warm air until the moisture content is reduced to about 8.5%.

The commercial process for the production of dextrose is described in more detail in Chapter 24 of "Starch Chemistry and Technology", Vol. 2, Industrial Aspects, R. L. Whistler and E. F. Paschall, Editors, Academic Press, New York and London, 1967.

The disadvantages of processes for producing granular dextrose such as the one described above, are that the crystallization step requires several days for completion; the amount of seed needed for crystallization is excessive; and the hydrolyzate solution is converted into the granular dextrose product at less than 100% yield.

An object of the invention is to provide a more practical method of producing granular dextrose from high solids content starch hydrolyzates.

Yet another object of the invention is to provide a method for producing granular dextrose wherein the crystallization of the starch hydrolyzate solution is completed within about 1 hour.

Another object of the invention is to provide a method for producing dextrose wherein less than about 10% by weight of seed dextrose is utilized to cause crystallization of a starch hydrolyzate solution.

A further object of the invention is to provide a granular dextrose product that is especially suitable for use in lozenges.

A still further object of the invention is to provide a fast dissolving granular β-dextrose product.

In accordance with the invention, I have discovered a process for producing a granular dextrose product which comprises seeding a starch hydrolyzate solution containing at least 90% by weight dry substance and having a dextrose equivalent (as later defined) of at least 90, to obtain a crystallized mass, breaking the mass up into particles, and recovering a granular dextrose product. The granular dextrose product is granular β-dextrose.

Starch hydrolyzate solutions that are suitable for use in the practice of the present invention include those formed by hydrolyzing starch slurries with acid, enzymes, or a combination of acid gelatinization or thinning and enzyme conversion.

In practicing the present invention, it is essential that the seeding of the starch hydrolyzate solution is performed at a temperature falling within the range from about 75° C. to about 120° C. Most preferably the seeding is performed at a temperature above about 93° C. The preferred seeding material is dextrose. Other seeding materials, in particular other sugars (e.g., levulose, sucrose, maltose, etc.), may be used but this leads to a less pure product and longer crystallization times. Most preferably, the seed dextrose is β-dextrose that has been prepared by the method of this invention, but it can be secured from any desired source.

The amount of seed sugar added to the starch hydrolyzate solution to initiate crystallization should be at least 1% by weight based on the total solution weight. Preferably, the amount of seed sugar added falls within the range from about 2% to about 10% of the total solution weight. Most preferably, about 5% by weight of seed dextrose is utilized.

After seeding has been completed, the solution is generally mixed and allowed to stand for a time falling within the range from about 5 minutes to about 1 hour to obtain a semisolid mass. The semisolid mass is preferably poured onto an essentially horizontal surface to a depth preferably falling within the range from about 1 centimeter to about 8 centimeters to obtain a cast dextrose sheet. When seeding temperatures above about 100° C. are used the seeded solution may be immediately poured onto the horizontal surface without being allowed to first stand.

The cast sugar is allowed to stand for at least 5 minutes and preferably up to about 45 minutes. Preferably, the depth of the semisolid mass after pouring is within the range from about 3 centimeters to about 5 centimeters, and the cast sugar is allowed to stand for a time falling within the range from about 10 minutes to about 20 minutes.

The cast sugar may be granulated to form relatively large dextrose granules. The granulation can be carried out using a Sharples granulator, a Tornado mill, or other equivalent apparatus. Relatively coarse granules of a size which will pass through a 10 millimeter by 10 millimeter opening in a sieve may be made by this procedure.

If finer granules are desired, the large granules must be allowed to stand for at least 15 minutes; they may then be reground to form a granular crystalline dextrose product having any desired degree of fineness. A uniform size granular product may be obtained by sifting the ground or reground dextrose.

The above described process is especially attractive in that it can easily be performed as a continuous process. FOr example, the essentially horizontal surface onto which the semisolid dextrose mass is poured to form a cast sugar can be a moving belt which will deliver the cast sugar to a granulating apparatus after a residence time on the belt falling within the range from about 5 minutes to about 45 minutes.

In the starch art, it is customary to describe a starch hydrolyzate solution in terms of its total reducing sugar content of dextrose equivalent. The dextrose equivalent (D.E.) of a hydrolyzate solution is determined by titrating a solution of a weighed quantity of the hydrolyzate solution with a mild oxidizer (Fehling's solution) in the presence of an oxidizable indicator such as ferrous cyanide until an end point is reached. From the amount of oxidizer used, it is possible to calculate the weight of pure dextrose with which the amount of oxidizer would react. This amount of dextrose is referred to as the weight of reducing sugars in the sample expressed as dextrose. The dextrose equivalent is the defined as in the following equation.

$$\text{Dextrose equivalent} = 100 \times \frac{\text{weight of reducing sugars as dextrose}}{\text{weight of starch hydrolyzate}}$$

The coarse grained granular dextrose product produced by the method of this invention may be very advantageously employed in the production of lozenges. Lozenges are generally made by mixing a major amount of a sweetening agent such as granulated sugar with a binder such as gelatin, a lubricant such as stearic acid or talc, and desired flavoring and coloring material such as citric acid, peppermint, and natural food colors. The resulting mixture is then dispensed into molds on a tableting machine and compressed into tablet form. Coarse grained granular dextrose is especially useful in such a process since it will flow quickly when it is dispensed. Also, during the operation of the tableting machine, fine grained dextrose may "dust" and may be blown out of the dies.

The β-dextrose produced according to this invention, due to its characteristics of quickly dispersing and dissolving may also be advantageously used in fermentation processes in the baking industry. In this application, the sugar is used as a nutrient for the yeast, as a means of modifying the bread's flavor, and as a contributor to the browning reaction necessary for crust color.

In a typical fermentation operation, sifted flour, yeast, dextrose, and the proper amount of water is metered into a bowl and the ingredients are mixed into a sponge. The sponge is dumped from the mixing chamber into greased troughs which are conveyed to a fermentation room where the temperature and humidity are adjusted for efficient yeast action; usually the temperature is about 27° C. and the relative humidity about 75 to 80%. Sponge fermentation time is variable but generally falls within the range from about 3.5 hours to about 5 hours. As the fermentation proceeds, there is an increase in the volume of the sponge. After the sponge is properly fermented it is placed in a mixer where non-fat dry milk, sugar, salt, shortening, and any other minor ingredients are added along with additional flour and water. The resulting mixture is baked.

The following examples will illustrate processes for preparing dextrose by the method of this invention. The examples are meant to be illustrative only and the invention, of course, is not to be limited thereto. All percentage figures are weight percent based on dry substance, unless otherwise specified.

EXAMPLE 1

Granular Dextrose Production

Unmodified corn starch was enzyme-enzyme converted to a starch hydrolyzate solution having a D.E. of 97. The hydrolyzate solution was decolorized with activated carbon and then concentrated by evaporation to a solution containing 93% solids. Seed crystals of dextrose (5% based on total solution weight) were added to the hydrolyzate solution at 80° C. The solution was stirred for about 10 minutes and was then cast upon a plastic sheet to a thickness of about 4 centimeters.

The cast sugar was allowed to stand for 35 minutes, after which it was broken up into large blocks and ground directly in a Tornado mill. The ground sugar would pass through a sieve containing 13 millimeter by 13 millimeter holes but would clog sieves with much smaller holes.

Similarly made sugar castings, when granulated using a Sharples granulator, allowed to dry for about 15 minutes and then ground using a Tornado mill, would pass through a sieve containing openings 3 millimeters by 3 millimeters.

The coarse, granular dextrose products of this invention were not hygroscopic, had a good appearance, and flowed readily. They were highly desirable for use in tabletting and in baking.

EXAMPLE 2

Effect of Grinding Followed by Granulation

A starch hydrolyzate solution with a D.E. of 97 and concentrated to 93% solids was seeded at 98° C. with 10% by weight of seed crystals of dextrose. The resulting seeded solution was held in the seeding tank for 15 minutes and then was poured at 94° C. to form a layer approximately 4 centimeters thick. The cast layer was allowed to stand for 10 minutes. The solidified sugar was then broken into large blocks and ground to pass through a screen containing 10 millimeter by 10 millimeter holes. The granules obtained were cooled and then further ground, to pass through a screen containing 1 millimeter by 1 millimeter holes.

The powdered product obtained was characterized by fine granules of good appearance, especially well suited for tabletting.

EXAMPLE 3

Effect of Using Different Amounts of Seed Dextrose

Four samples of a starch hydrolyzate liquor with a D.E. of 97 and containing 93% solids were each seeded with dextrose as follows, the parts being expressed by weight based on the total hydrolyzate weight:

3.1 10% dextrose as seed.
3.2 5% dextrose as seed.
3.3 10% ground cast sugar from Example 2 (crude dexrose) as seed.
3.4 5% ground cast sugar from Example 2 as seed.

Samples 3.1 and 3.2 were each mixed for 15 minutes before casting. For each, the pouring temperature was 91° C. and the standing time, after casting, was 10 minutes with 10% seed (Example 3.1) and 13 minutes with 5% seed (Example 3.2). Very good coarse granular dextrose was obtained when both products were ground to pass through a screen containing 10 millimeter by 10 millimeter holes.

The mixing time before casting with each of Examples 3.3 and 3.4 was 8 minutes. For each, the pouring temperature was 93° C. The casting time was 6 minutes for Example 3.3 and 7 minutes for Example 3.4. Excellent coarse granular dextrose was obtained when both products were ground to pass through a screen with 10 millimeter by 10 millimeter holes.

As these demonstrations of the invention show, mixing time and casting time can be sharply reduced, if ground sugar from previous runs is utilized as seed in preference to seed crystals from other sources.

CONCLUSION

The rapid production of coarse granular dextrose of different particle sizes has been amply demonstrated by the examples. The granular dextrose produced in this manner disperses and dissolves quickly in aqueous solvents. The granular $\beta$-dextrose produced by the methods of this invention may be used in any of the ways dextrose is normally used, for example, in baking products, in confections such as lozenges, and the like.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essentials features hereinbefore set forth, and as fall within the scope of the invention.

That which is claimed is:

1. A process for producing a granular dextrose product having a high content of beta dextrose which comprises adding, to a starch hydrolysate solution containing at least 90% dry substance by weight and having a D.E. of at least 90, seed in an amount of from at least 1% to about 10% by weight based on the total solids weight, while the temperature of the starch hydrolysate is within the range of between about 75° C. and about 120° C.;

transferring the resultant seeded hydrolysate mass to an essentially horizontal surface, and maintaining it on said surface for a time period of between about 5 minutes and about 1 hour, during which time period the hydrolysate crystallizes to a solid mass;

breaking the crystallized solid mass into particles; and recovering the resultant granular dextrose product.

2. A process in accordance with claim 1 wherein the seed comprises crystals of dextrose.

3. A process in accordance with claim 1 wherein the seed comprises granular dextrose obtained from a previous run of the process.

4. A process in accordance with claim 1 wherein the seed is added in an amount of between about 2% and about 10% by weight of the total solution weight.

5. A process in accordance with claim 1 wherein the temperature of the starch hydrolysate, at the time the seed is added, is within the range of about 93° C. to about 120° C.

6. A process in accordance with claim 1 wherein the essentially horizontal surface is an essentially horizontal moving belt.

7. A process in accordance with claim 1 wherein the crystallized solid mass is broken into particles which are sufficiently small to pass through a screen having 10 millimeter by 10 millimeter openings.

8. A process in accordance with claim 7 containing the additional steps of permitting the granular dextrose particles to stand for at least 15 minutes, and subsequently regrinding them to a finer particle size.

9. A continuous process for producing a granular dextrose product having a high content of beta dextrose which comprises:

concentrating a starch hydrolysate, having a dextrose equivalent of at least 90, to a solids content of at least 90% by weight;

adjusting the temperature to within the range of between about 93° C. and about 120° C. and, while the temperature of the hydrolysate is within this range, adding dextrose seed crystals in an amount within the range of between about 2% and about 10%, based on the total solids;

mixing the seeded starch hydrolysate, during which mixing crystallization is initiated and the hydrolysate forms a semisolid mass;

continuously discharging the semisolid mass from the mixing zone onto an essentially horizontal moving belt;

maintaining the mass on the moving belt for a time period within the range of between about 5 minutes and about 45 minutes, during which time period the hydrolysate crystallizes to a solid mass;

continuously removing the crystallized solid mass from the belt and breaking it into particles of the desired size; and recovering the resultant granular dextrose product.

* * * * *

UNITED STATES PATENT OFFICE
CERTIFICATE OF CORRECTION

Patent No. 3,650,829     Dated March 21, 1972

Inventor(s) Raoul Guillaume Phillippe Walon

It is certified that error appears in the above-identified patent and that said Letters Patent are hereby corrected as shown below:

"Assignees: CPC International Inc., Les Industries du Mais"

should be -- CPC International Inc.--.

Signed and sealed this 10th day of April 1973.

(SEAL)
Attest:

EDWARD M. FLETCHER, JR.
Attesting Officer

ROBERT GOTTSCHALK
Commissioner of Patents